(12) United States Patent
Ghannam et al.

(10) Patent No.: US 9,938,951 B1
(45) Date of Patent: Apr. 10, 2018

(54) DETERRENCE OF IGNITION OF A VEHICLE ENGINE WHEN A FUEL NOZZLE IS IN A FUEL INTAKE AREA

(71) Applicant: Ford Global Technologies, LLC, Dearborn, MI (US)

(72) Inventors: Mahmoud Yousef Ghannam, Canton, MI (US); Muhannad Hamdan, Canton, MI (US); Ahmad Maarouf, Canton, MI (US); Swadad A. Carremm, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/273,520

(22) Filed: Sep. 22, 2016

(51) Int. Cl.
F02N 15/10 (2006.01)
B60K 15/04 (2006.01)
B60R 11/04 (2006.01)
B60R 1/12 (2006.01)
H04N 7/18 (2006.01)
G06K 9/00 (2006.01)
B60K 15/03 (2006.01)

(52) U.S. Cl.
CPC ............... *F02N 15/10* (2013.01); *B60K 15/04* (2013.01); *B60R 1/12* (2013.01); *B60R 11/04* (2013.01); *G06K 9/00791* (2013.01); *H04N 7/183* (2013.01); *B60K 2015/0323* (2013.01); *B60K 2015/03328* (2013.01); *B60R 2001/1253* (2013.01); *B60R 2300/8026* (2013.01)

(58) Field of Classification Search
CPC ........... F02N 15/10; H04N 7/183; B60R 1/12; B60R 11/04; B60R 2300/8026; B60R 2001/1253; B60K 15/04; B60K 2015/03328; B60K 2015/0323; G06K 9/00791
See application file for complete search history.

(56) References Cited

U.S. PATENT DOCUMENTS

| 5,720,327 A | 2/1998 | Foster, Jr. |
| 6,021,823 A | 2/2000 | Hale |
| 7,051,831 B2 | 5/2006 | Scholer et al. |
| 2013/0025698 A1 | 1/2013 | Safi-Samghabadi et al. |

FOREIGN PATENT DOCUMENTS

WO    WO 2008017756 A2    2/2008

*Primary Examiner* — Joseph Dallo
(74) *Attorney, Agent, or Firm* — James P. Muraff; Neal, Gerber & Eisenberg LLP

(57) ABSTRACT

Methods, apparatus, and computer readable media are disclosed for deterrence of ignition of a vehicle engine ignition when a fuel nozzle is in a fuel intake area. An example vehicle includes a fuel intake area, a camera, and a processor. The example processor, in response to an ignition switch being in an on-position, is to detect, via the camera, whether a fuel nozzle is in the fuel intake area. The example processor is to deter ignition of a vehicle engine when the fuel nozzle is in the fuel intake area.

20 Claims, 4 Drawing Sheets

DETERRENCE OF IGNITION OF A VEHICLE ENGINE WHEN A FUEL NOZZLE IS IN A FUEL INTAKE AREA

TECHNICAL FIELD

The present disclosure generally relates to vehicle engine ignition and, more specifically, deterrence of ignition of a vehicle engine when a fuel nozzle is in a fuel intake area.

BACKGROUND

Vehicles require refueling over time. Generally, such vehicles include a fuel tank that receives and stores petroleum (e.g., gasoline, diesel, etc.) and/or other fuel utilized by the engine to propel the vehicle. Oftentimes, the fuel tank includes an inlet that is accessible to an exterior of vehicle to enable the fuel tank to be refueled. For example, to refuel the vehicle, a nozzle of a fuel dispenser may be inserted into the inlet to enable fuel to be supplied to the fuel tank from the fuel dispenser via the nozzle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for deterrence of ignition of a vehicle engine when a fuel nozzle is in a fuel intake area. An example disclosed apparatus includes a fuel intake area, a camera, and a processor. The example processor, in response to an ignition switch being in an on-position, is to detect, via the camera, whether a fuel nozzle is in the fuel intake area. The example processor is to deter ignition of a vehicle engine when the fuel nozzle is in the fuel intake area.

An example disclosed method to deter movement of a vehicle with a fuel nozzle includes, in response to an ignition switch being in an on-position, detecting, via a vehicle camera, whether a fuel nozzle is in a fuel intake area of the vehicle. The example method includes deterring, via a processor, ignition of an engine when the fuel nozzle is in the fuel intake area.

An example disclosed tangible computer storage medium includes instructions which, when executed, cause a machine, in response to an ignition switch being in an on-position, to detect, via a vehicle camera, whether a fuel nozzle is in a fuel intake area of the vehicle. The example instructions cause a machine to deter ignition of an engine when the fuel nozzle is in the fuel intake area.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
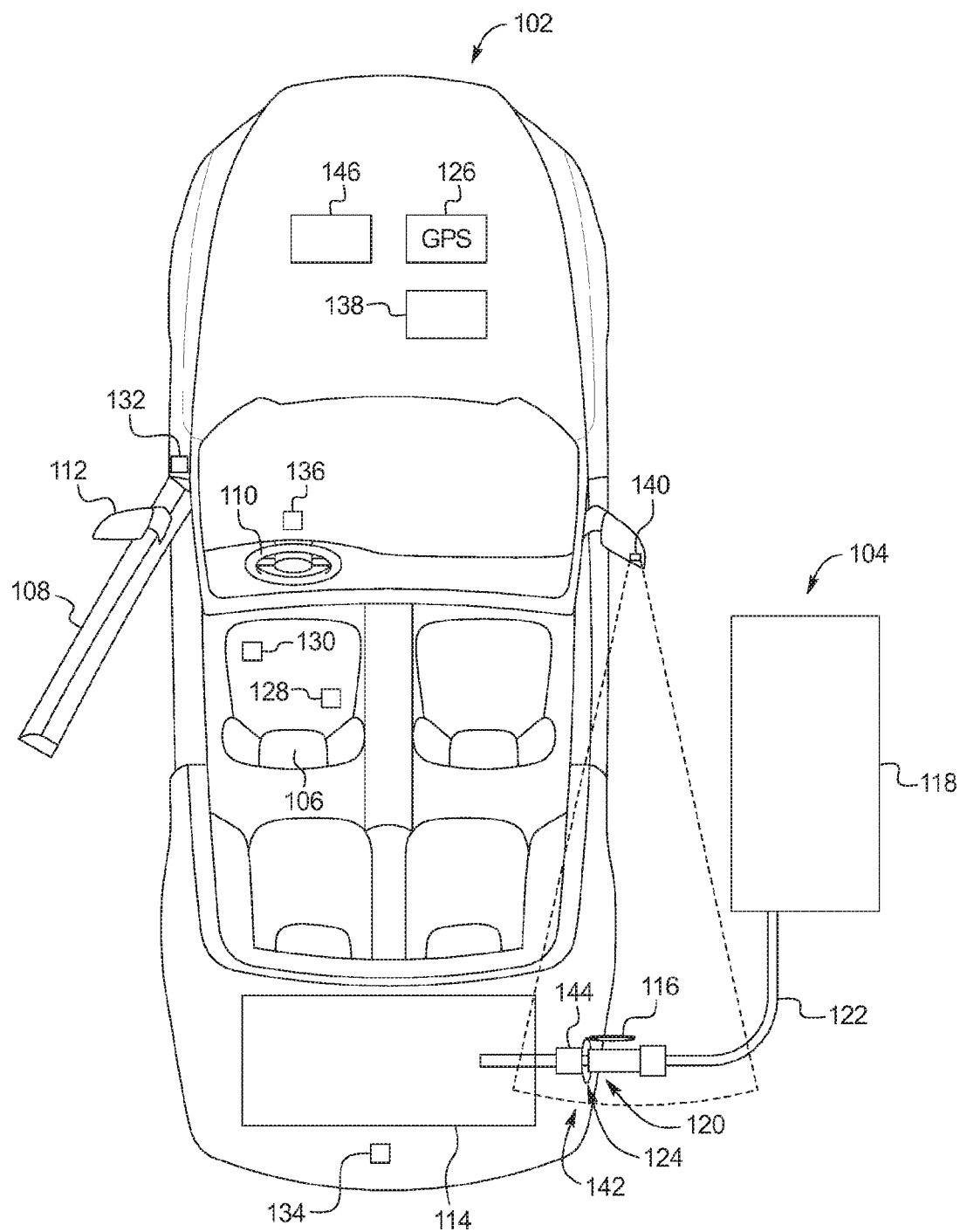
FIG. 1 illustrates a vehicle and a fuel dispenser in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles require fuel to operate. For example, a vehicle with an internal combustion engine includes a fuel tank that receives and stores petroleum (e.g., gasoline, diesel, etc.) and/or other fuel utilized by the engine to propel the vehicle. The fuel of the fuel tank is provided to the engine to propel the vehicle. Thus, over time, the fuel tank of the vehicle must be refilled to enable continued operation of the vehicle. Oftentimes, the fuel tank includes a passageway that is accessible to an exterior of vehicle via an inlet to enable the fuel tank to be refueled. For example, a nozzle of a fuel dispenser is inserted into the inlet. Subsequently, fuel is supplied from the fuel dispenser via the nozzle to refill the fuel tank. Additionally or alternatively, electric and/or hybrid vehicles include a battery that stores electricity for the engine. Such vehicles are recharged to enable continued operation of the vehicles. For example, an electric and/or hybrid vehicle is recharged via by plugging an electric nozzle of an electric fueling into an electrical inlet of the vehicle that is electrically coupled to the rechargeable battery. As used herein, "fuel" refers to petroleum, electricity, and/or any other source of energy utilized to operate a vehicle. A "fuel container" refers to a fuel tank, battery, and/or any other container that stores energy for the vehicle. "Refueling" and "refuel" refers to the act of refilling a fuel container of the vehicle (e.g., recharging a battery of an electric vehicle).

In many regions (e.g., the United States), self-service fueling stations are common. With a self-serving fueling station, the driver or a passenger of the vehicle (as opposed to an employee of the fueling station) operates a fuel dispenser of the fueling station to refuel the vehicle. For example, the driver of the vehicle removes the nozzle from a nozzle receptacle of the fuel dispenser, inserts the nozzle into the inlet of fuel container of the vehicle, and initiates the fuel dispenser to provide fuel to the fuel container of the vehicle via the nozzle. In some instances, the driver or passenger refueling the vehicle may reenter the vehicle without removing the nozzle from the inlet of the fuel container. If the driver drives the vehicle away from the fuel dispenser of the fueling station while the nozzle remains in the inlet of the fuel container, the nozzle may become separated from the fuel dispenser and/or the fuel dispenser may otherwise become damaged. Further, a spark may form as the nozzle separates from the fuel dispenser and/or fuel may escape from the fuel container of the vehicle and/or the fuel dispenser, potentially creating a hazardous condition in the vicinity.

The examples apparatus, methods, and machine readable media disclosed herein deter and/or prevent a vehicle from moving away from a fuel dispenser (e.g., a gas pump) when a fuel nozzle of the fuel dispenser is inserted into an inlet of a fuel container to potentially improve safety of a refueling process. For example, the vehicle includes sensor that identify when a fueling event (e.g., when the vehicle is being refueled) is occurring and/or has been completed. In some examples, the vehicle includes a global positioning sensor (GPS) receiver that identifies when the vehicle is located at the fuel dispenser of a fueling station (e.g., a gas station).

When the GPS determines that the vehicle is at the fueling station and/or the fuel dispenser, another sensor of the vehicle may detect that the fuel container of the vehicle is being refueled. For example, a seatbelt switch, a door-ajar switch, and/or a weight sensor of a vehicle seat are utilized to identify when a driver and/or passenger has exited the vehicle at the fueling station to refuel the vehicle. When the vehicle detects that the fuel container is being refilled, a transmission of the vehicle is shifted into park and an ignition of the vehicle is turned off to potentially improve safety during the fueling event by deterring the vehicle from moving away from the fueling station and/or by deterring a spark from forming while the vehicle is being refueled.

Further, at least one of the sensors of vehicles detects when the refueling of the vehicle has been completed. For example, a fuel level sensor of the fuel container may identify that fuel has stopped being added to the fuel container. Additionally or alternatively, the seatbelt switch, the door-ajar switch, and/or the weight sensor may indicate that the driver and/or passenger of the vehicle has reentered the vehicle upon refueling the vehicle. Upon determining that the vehicle has been refueled, an ignition switch of the vehicle is monitored.

Once the driver turns the ignition switch to an on-position to restart the vehicle, a fuel intake area at and/or around the inlet of the fuel container is monitored to identify whether the fuel nozzle of the fuel dispenser has been removed from the inlet of the fuel container. For example, the sensor is a camera (e.g., coupled to a side-view mirror) that is directed to the fuel intake area. In other examples, the sensor is a switch (e.g., a proximity switch, a magnetic switch, etc.) that is positioned in and/or adjacent the fuel intake area to detect a presence of the fuel nozzle in the inlet of the fuel container. When the camera and/or other sensor of the vehicle detects that the fuel nozzle remains in the fuel intake area, the vehicle deters ignition of an engine of the vehicle, for example, by providing an alarm (e.g., via an infotainment head unit) and/or by disabling and/or delaying (e.g., for a predetermined time such as 30 seconds) ignition of the engine via an emergency override to prevent the vehicle from moving away from the fuel dispenser with the fuel nozzle. In contrast, the vehicle enables ignition of the engine when the camera and/or other sensor of the vehicle detects that the fuel nozzle remains in the fuel intake area.

Turning to the figures, FIG. 1 illustrates a vehicle 102 that is refueled by a fuel dispenser 104 (e.g., a gas pump) of a fueling station (e.g., a gas station) in accordance with the teachings of this disclosure. The vehicle 102 may be a standard gasoline powered vehicle, a hybrid vehicle, an electric vehicle, a fuel cell vehicle, and/or any other mobility implement type of vehicle. The vehicle 102 includes parts related to mobility, such as a powertrain with an engine, a transmission, a suspension, a driveshaft, and/or wheels, etc. The vehicle 102 may be non-autonomous, semi-autonomous (e.g., some routine motive functions controlled by the vehicle 102), or autonomous (e.g., motive functions are controlled by the vehicle 102 without direct driver input).

In the illustrated example, the vehicle 102 includes seats 106, doors 108, a steering wheel 110, side-view mirrors 112, a fuel container 114, and a fuel inlet door 116. Further, as illustrated in FIG. 1, the fuel dispenser 104 includes a body 118, a nozzle 120, and tubing 122 to fluidly couple the nozzle 120 to the body 118. As illustrated in FIG. 1, the fuel inlet door 116 is rotated open and the nozzle 120 is inserted into an inlet 124 of the fuel container 114 to enable the fuel container 114 to be refueled via the fuel dispenser 104. For example, upon inserting the nozzle 120 into the inlet 124 of the fuel container 114, an operator of the fuel dispenser 104 (e.g., a driver or passenger of the vehicle 102, an employee of the fueling station) initiates fuel to be discharged from the nozzle 120 of the fuel dispenser 104 and into the fuel container 114 of the vehicle 102.

The vehicle 102 includes one or more sensors that identify when a fueling event of the vehicle 102 is occurring and/or has been completed. As illustrated in FIG. 1, the vehicle 102 includes a global positioning sensor (GPS) receiver 126, a seatbelt switch 128, a weight sensor 130, a door-ajar switch 132, and a fuel level sensor 134. For example, the GPS receiver 126 monitors a position of the vehicle 102, and fuel level sensor 134 monitors an amount of fuel within the fuel container 114 of the vehicle 102. Further, in the illustrated example, the seatbelt switch 128 detects or identifies when a seatbelt of the corresponding seat 106 is buckled and/or unbuckled (e.g., by the driver), the weight sensor 130 detects or identifies when the driver is seated on and/or unseated from the corresponding seat 106, and the door-ajar switch 132 detects or identifies when the corresponding door 108 is opened and/or closed (e.g., by the driver). Additionally or alternatively, the vehicle 102 may include a seatbelt switch and/or a weight sensor to monitor one of the other seats 106 for a passenger of the vehicle 102 and/or may include a door-ajar switch for one of the other doors 108 for the passenger.

The vehicle 102 also includes an ignition switch 136 and an engine control unit 138 that controls performance of the engine of the vehicle 102. The ignition switch 136 may include a rotatable switch in which a key is inserted to enable rotation, a pushbutton, and/or any other type of switch that is able to actuate between an on-position and an off-position. The engine control unit 138 monitors the ignition switch 136 to control performance of the engine. For example, if the engine is deactivated and/or off, the engine control unit 138 may activate and/or turn on the engine when the engine control unit 138 detects that the ignition switch 136 has been actuated to an on-position (e.g., by the driver). Further, if the engine is activated and/or on, the engine control unit 138 may deactivate and/or turn off the engine when the engine control unit 138 detects that the ignition switch 136 has been actuated to an off-position (e.g., by the driver).

Further, the vehicle 102 includes a camera 140 that monitors a fuel intake area 142 of the vehicle 102. For example, the fuel intake area 142 includes an area including and adjacent to the inlet 124 of the fuel container 114. In the illustrated example, the camera 140 is positioned on the side-view mirror 112 that is on the same side of the vehicle 102 as the inlet 124 of the fuel container 114 (e.g., the passenger side) to enable the camera 140 to monitor the fuel intake area 142. In some examples, the camera 140 is utilized by the vehicle 102 for additional functions such as monitoring blind spots. For example, the vehicle 102 utilizes the camera 140 for blind spot monitoring when the vehicle 102 is moving and utilizes the camera 140 for monitoring the fuel intake area 142 when the vehicle 102 is stationary at the fueling station. Additionally, the vehicle 102 includes a nozzle detection switch 144 that detects when the nozzle 120 is inserted into the inlet 124 of the fuel container 114 of the vehicle 102. For example, the nozzle detection switch 144 is a magnetic switch or a proximity switch that is positioned in and/or adjacent the inlet 124 of the fuel container 114 to detect whether the nozzle 120 is in and/or removed from the inlet 124.

As illustrated in FIG. 1, the vehicle 102 also includes a nozzle tracker 146 that is communicatively coupled to the GPS receiver 126, the seatbelt switch 128, the weight sensor 130, the door-ajar switch 132, the fuel level sensor 134, the engine control unit 138, the camera 140, and the nozzle detection switch 144 of the vehicle 102.

In operation, to prevent the vehicle 102 from traversing away from the body 118 of the fuel dispenser 104 while the nozzle 120 remains inserted into the inlet 124 of the vehicle 102, the nozzle tracker 146 identifies when the vehicle 102 is located at the fuel dispenser 104 of a fueling station. For example, the nozzle tracker 146 determines that the vehicle 102 is at the fuel dispenser via global positioning data collected from the GPS receiver 126. Additionally or alternatively, the nozzle tracker 146 may monitor detect habitual fueling events via a pattern recognition system. For example, the nozzle tracker 146 may identify that the driver refuels the vehicle 102 every Monday morning at 7:25 A.M.

After the nozzle tracker 146 determines that the vehicle 102 is at the fuel dispenser 104, the nozzle tracker 146 detects when a fueling event is occurring and/or has completed. In some examples, the nozzle tracker 146 utilizes data collected via the fuel level sensor 134 to monitor the fueling event. For example, the fuel level sensor 134 identifies that the fueling event is occurring by detecting that a fuel level of the fuel container 114 is increasing and identifies that the fueling event has ended by detecting that the fuel level of the fuel container 114 has stopped increasing. Additionally or alternatively, the nozzle tracker 146 detects the fueling event based on data collected from the seatbelt switch 128, the weight sensor 130, and/or the door-ajar switch 132. For example, when the nozzle tracker 146 identifies that the vehicle 102 is at the fuel dispenser 104, the nozzle tracker 146 determines that the fueling event upon the seatbelt switch 128 detecting that the seatbelt is unbuckled, the weight sensor 130 detecting that the driver is no longer seated in the seat 106, and/or the door-ajar switch 132 detecting that the door 108 has been opened. Further, the nozzle tracker 146 may determine that the identified fueling event has ended when the seatbelt switch 128 indicates the seatbelt has been buckled, the weight sensor 130 identifies the driver has returned to the seat 106, and/or the door-ajar switch 132 identifies the door 108 has been closed.

Upon detecting the fueling event, the nozzle tracker 146 monitors the ignition switch 136 via the engine control unit 138. When the ignition switch 136 is actuated to the on-position to activate the engine of the vehicle 102, the nozzle tracker 146 determines whether nozzle 120 is in the inlet 124 of the fuel container 114 via the camera 140 and/or the nozzle detection switch 144. When the nozzle tracker 146 determines that the nozzle 120 remains in the fuel intake area 142, the nozzle tracker 146 deters ignition of the engine of the vehicle 102. In some examples, the nozzle tracker 146 provides a warning (e.g., an audible warning, a visual warning, etc.) to the driver (e.g., via an infotainment head unit 302 of FIG. 3). Additionally or alternatively, the nozzle tracker 146 may disable ignition of the engine via an emergency override of the engine control unit 138 to prevent the vehicle 102 from moving when the nozzle 120 is in the fuel intake area 142. In other examples, the nozzle tracker 146 may delay ignition (e.g., for a predetermined amount of time such as 15 seconds, 30 seconds, 45 seconds, 1 minute, etc.) via the engine control unit 138 to enable the driver to check the fuel intake area 142 before being able to drive away from the fuel dispenser 104.

Figure 2:
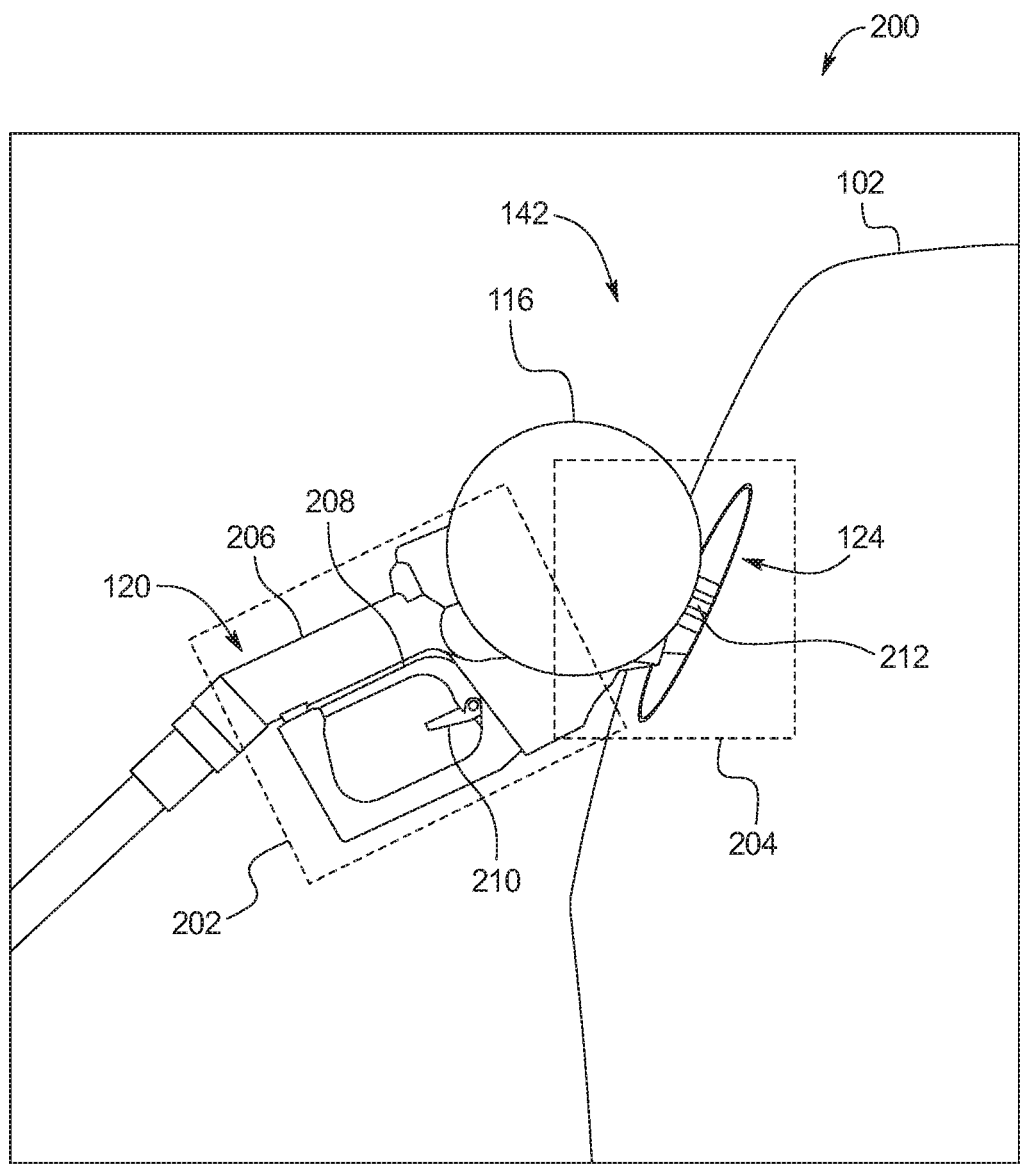
FIG. 2 is an image obtained via a camera of the vehicle of FIG. 1 that is utilized to monitor a fuel intake area of the vehicle of FIG. 1.

FIG. 2 is an example image 200 obtained via the camera 140 that the nozzle tracker 146 utilizes to monitor the fuel intake area 142 of the vehicle 102. In the illustrated example, the image 200 enables the nozzle tracker 146 to detect that the nozzle 120 remains in the fuel intake area 142. For example, an image recognition system of the nozzle tracker 146 identifies a first boundary 202 and a second boundary 204 of the image 200. The first boundary 202 identified by the image recognition system includes features of the nozzle 120, such as a handle 206, a trigger 208 and/or a locking clip 210. The second boundary 204 includes features of the fuel intake area 142 associated with a fueling event, such as the inlet 124, the fuel inlet door 116 in an open position, and a hinge 212 that enables the fuel inlet door 116 to be in the open position. Because the image recognition system identifies features in the first boundary 202 associated with the nozzle 120 and/or features in the second boundary 204 associated with a fueling event, the image 200 obtained by the camera 140 enables the nozzle tracker 146 to detect that the nozzle 120 is in the fuel intake area 142.

Figure 3:
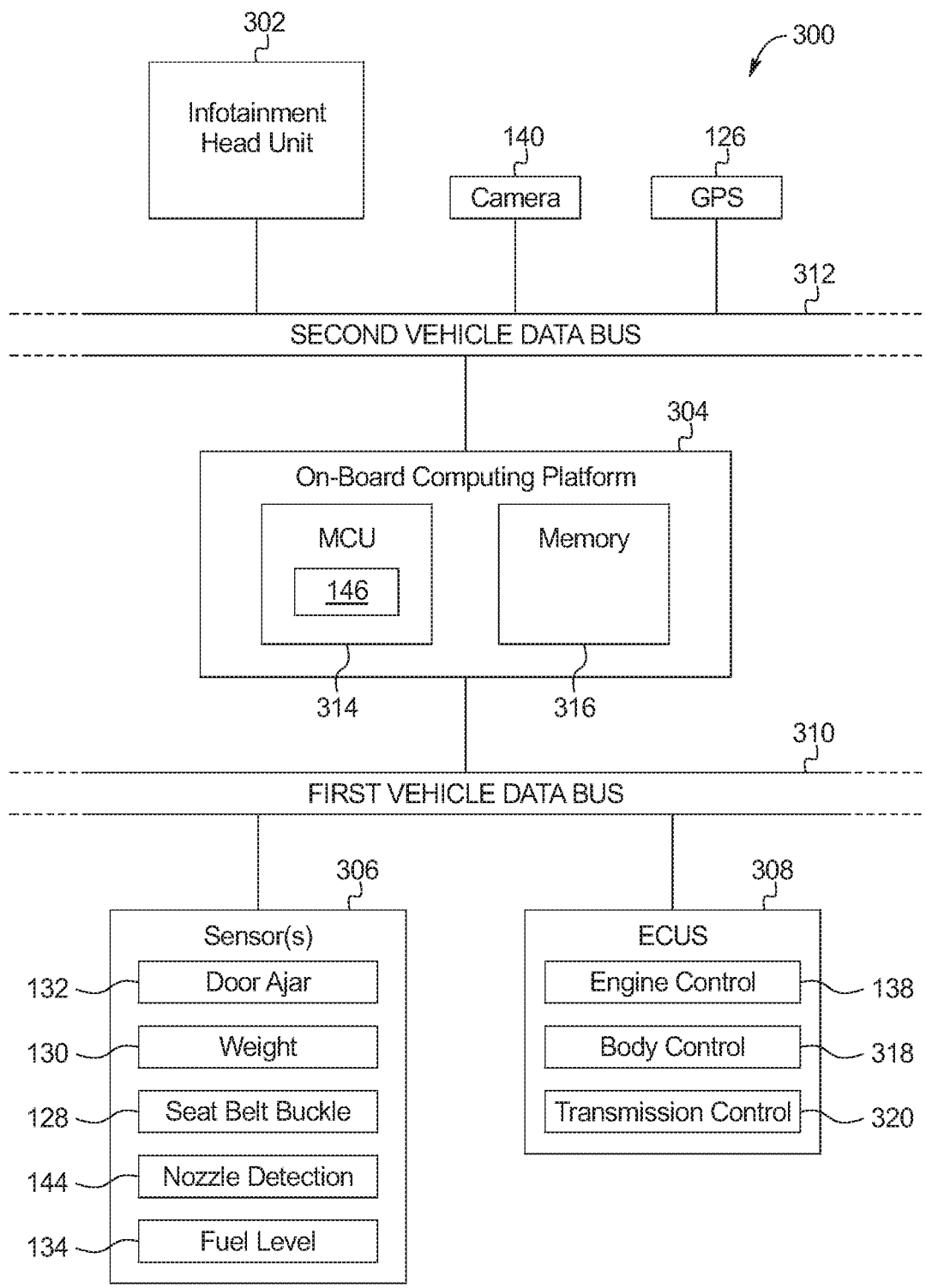
FIG. 3 is a block diagram of electronic components of the vehicle of FIG. 1.

FIG. 3 is a block diagram of electronic components 300 of the vehicle 100 of FIG. 1. The electronic components 300 include an example infotainment head unit 302, the example camera 140, the example GPS receiver 126, an example on-board computing platform 304, example sensors 306, example electronic control units (ECUs) 308, an example first vehicle data bus 310, and an example second vehicle data bus 312.

The infotainment head unit 302 provides an interface between the vehicle 102 and a user. The infotainment head unit 302 includes digital and/or analog interfaces (e.g., input devices and output devices) to receive input from the user(s) and display information. The input devices includes, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 302 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 302 displays the infotainment system on, for example, the center console display.

The on-board computing platform 304 includes a microcontroller unit, controller or processor 314 and memory 316. In some examples, the on-board computing platform 304 is structured to include the nozzle tracker 146. Alternatively, in some examples, the nozzle tracker 146 is incorporated into another electronic control unit (ECU) with its own processor 314 and memory 316. The processor 314 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 316 may be volatile memory (e.g., RAM including non-volatile RAM, magnetic RAM, ferroelectric RAM, etc.); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 316 includes multiple kinds of memory, particularly volatile memory and non-volatile memory.

The memory 316 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 316, the computer readable medium, and/or within the processor 314 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 306 are arranged in and around the vehicle 102 to monitor properties of the vehicle 102 and/or an environment in which the vehicle 102 is located. One or more of the sensors 306 may be mounted to measure properties around an exterior of the vehicle 102. Additionally or alternatively, one or more of the sensors 306 may be mounted inside a cabin of the vehicle 102 or in a body of the vehicle 102 (e.g., an engine compartment, wheel wells, etc.) to measure properties in an interior of the vehicle 102. For example, the sensors 306 include accelerometers, odometers, tachometers, pitch and yaw sensors, wheel speed sensors, microphones, tire pressure sensors, biometric sensors and/or sensors of any other suitable type. In the illustrated example, the sensors 306 include the seatbelt switch 128, the weight sensor 130, the door-ajar switch 132, the nozzle detection switch 144, and the fuel level sensor 134.

The ECUs 308 monitor and control the subsystems of the vehicle 102. For example, the ECUs 308 are discrete sets of electronics that include their own circuit(s) (e.g., integrated circuits, microprocessors, memory, storage, etc.) and firmware, sensors, actuators, and/or mounting hardware. The ECUs 308 communicate and exchange information via a vehicle data bus (e.g., the first vehicle data bus 310). Additionally, the ECUs 308 may communicate properties (e.g., status of the ECUs 308, sensor readings, control state, error and diagnostic codes, etc.) to and/or receive requests from each other. For example, the vehicle 102 may have seventy or more of the ECUs 308 that are positioned in various locations around the vehicle 102 and are communicatively coupled by the first vehicle data bus 310. In the illustrated example, the ECUs 308 include the engine control unit 138, a body control module 318, and a transmission control unit 320. The body control module 318 controls one or more subsystems throughout the vehicle 102, such as power windows, power locks, an immobilizer system, power mirrors, etc. For example, the body control module 318 includes circuits that drive one or more of relays (e.g., to control wiper fluid, etc.), brushed direct current (DC) motors (e.g., to control power seats, power locks, power windows, wipers, etc.), stepper motors, LEDs, etc. Further, the transmission control unit 320 controls the transmission of the vehicle 102. For example, the transmission control unit 320 shifts the transmission of the vehicle 102 into and/or out of drive, park, reverse, neutral, etc.

The first vehicle data bus 310 communicatively couples the sensors 306, the ECUs 308, the on-board computing platform 304, and any other devices connected to the first vehicle data bus 310. In some examples, the first vehicle data bus 310 is implemented in accordance with the controller area network (CAN) bus protocol as defined by International Standards Organization (ISO) 11898-1. Alternatively, in other examples, the first vehicle data bus 310 is a Media Oriented Systems Transport (MOST) bus or a CAN flexible data (CAN-FD) bus (ISO 11898-7). Further, the second vehicle data bus 312 communicatively couples the infotainment head unit 302, the camera 140, the GPS receiver 126, the on-board computing platform 304, and any other devices connected to the second vehicle data bus 312. For example, the second vehicle data bus 312 may be a MOST bus, a CAN-FD bus, or an Ethernet bus. In some examples, the on-board computing platform 304 communicatively isolates the first vehicle data bus 310 and the second vehicle data bus 312 (e.g., via firewalls, message brokers, etc.). Alternatively, in other examples, the first vehicle data bus 310 and the second vehicle data bus 312 are the same data bus.

Figure 4:
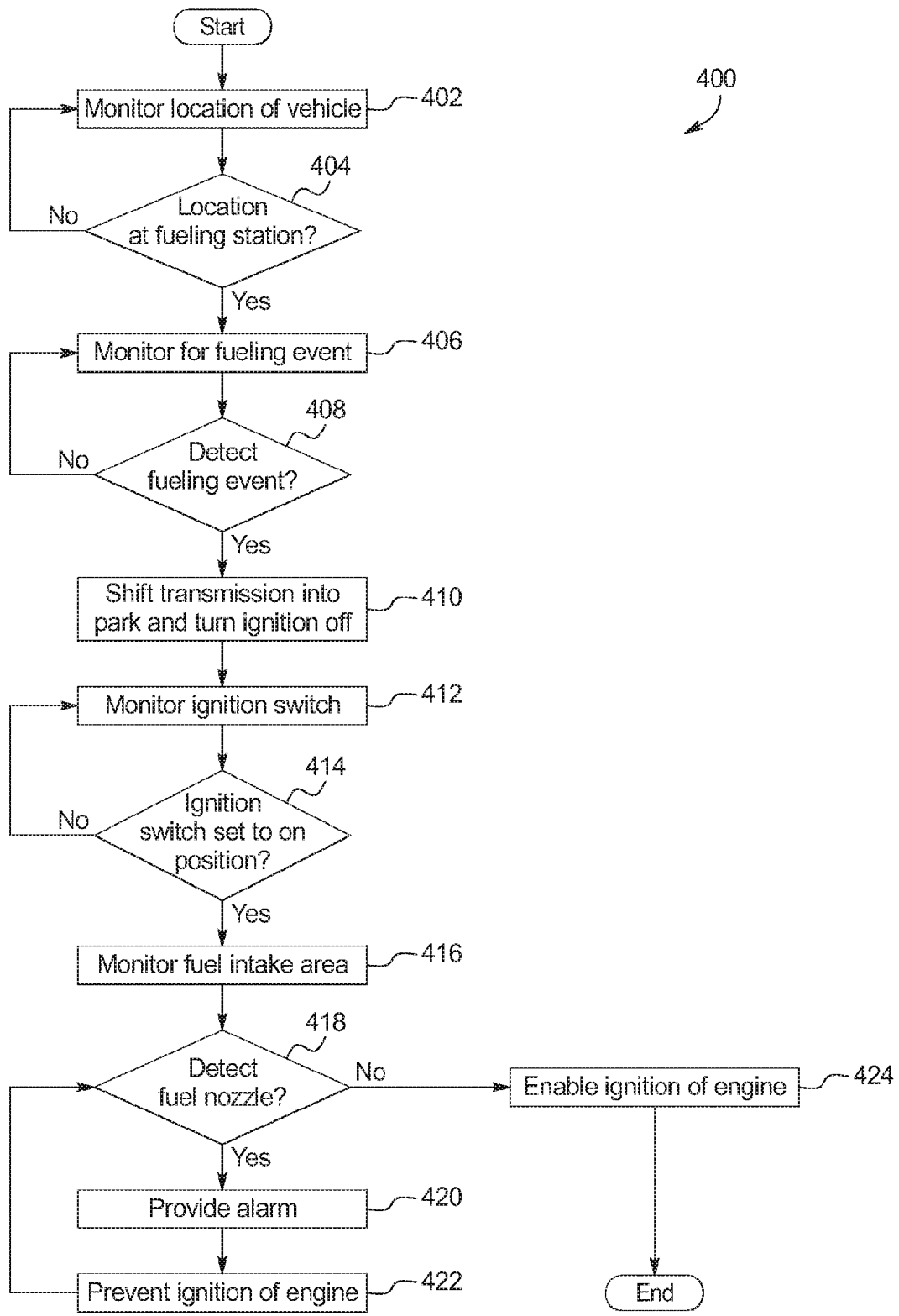
FIG. 4 is a flowchart of an example method to monitor the fuel intake area of FIG. 2 and control ignition of the vehicle of FIG. 1.

FIG. 4 is a flowchart of an example method 400 to monitor a fuel intake area and control ignition of a vehicle. The flowchart of FIG. 4 is representative of machine readable instructions that are stored in memory (such as the memory 316 of FIG. 3) and include one or more programs which, when executed by a processor (such as the processor 314 of FIG. 3), cause the vehicle 102 to implement the example nozzle tracker 146 of FIGS. 1 and 3. While the example program(s) is/are described with reference to the flowchart illustrated in FIG. 4, many other methods of implementing the example nozzle tracker 146 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the nozzle tracker 146 monitors a location of the vehicle 102. For example, the nozzle tracker monitors the location of the vehicle utilizing data collected via the GPS receiver 126 and/or a pattern recognition system. At block 404, the nozzle tracker 146 determines whether the vehicle is located at a fueling station and/or the fuel dispenser 104 of the fueling station. If the nozzle tracker 146 determines that vehicle 102 is not located at the fueling station, the method 400 returns to block 402. Otherwise, if the nozzle tracker 146 determines that vehicle 102 is located at the fueling station, the method continues to block 406 at which the nozzle tracker 146 monitors for a fueling event. For example, the nozzle tracker 146 monitors for the fueling event utilizing data collected via the seatbelt switch 128, the weight sensor 130, the door-ajar switch 132, and/or the fuel level sensor 134. At block 408, the nozzle tracker 146 detects whether the fueling event is occurring. If the nozzle tracker 146 does not detect the fueling event, the method 400 returns to block 406. Otherwise, if the nozzle tracker 146 detects the fueling event, the method 400 continues to block 410 at which the nozzle tracker 146 instructs the transmission of the vehicle 102 to shift into park and the ignition of the vehicle 102 to turn off.

At block 412, upon shifting the ignition into park and turning the ignition off, the nozzle tracker 146 monitors the ignition switch 136 to detect when the driver of the vehicle is attempting to restart the vehicle 102. At block 414, the nozzle tracker 146 determines whether the ignition switch 136 is set to the on-position. If the nozzle tracker 146 determines that the ignition switch 136 is not set in the on-position (i.e., if the ignition switch 136 remains in an off-position), the method 400 returns to block 412. Otherwise, upon detecting that the ignition switch 136 is set in the on-position, the method 400 continues to block 416 at which the nozzle tracker 146 monitors the fuel intake area 142 of the vehicle 102. For example, the nozzle tracker 146 monitors the fuel intake area 142 via the camera 140 and/or the nozzle detection switch 144.

At block 418, the nozzle tracker 146 detects whether the nozzle 120 is in the fuel intake area 142. In some examples, if the nozzle tracker 146 detects the presence of the nozzle 120, the method 400 continues to block 420 at which the nozzle tracker 146 provides an alarm to deter the driver from driving the vehicle 102 away from the fuel dispenser 104 with the nozzle 120. For example, the nozzle tracker 146 provides an audio and/or visual alarm via the infotainment head unit 302 of the vehicle 102. Additionally or alternatively, at block 422, the nozzle tracker 146 prevents and/or delays (e.g., for a predetermined amount of time) ignition of the engine to prevent and/or deter the vehicle 102 from moving away from the fuel dispenser 104 with the nozzle 120. Upon completing blocks 420 and 422, the method 400 returns to block 418. Otherwise, if the nozzle tracker 146 does not detect the presence of the nozzle 120, the method 400 continues to block 424 at which the nozzle tracker 146 enables ignition of the engine of the vehicle 102 to enable the vehicle 102 to move away from the fuel dispenser 104.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The term "include" and its various forms and tenses are inclusive and have the same scope as "comprise" and its various forms and tenses.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a fuel intake area;
   a camera; and
   a processor to:
      in response to an ignition switch being in an on-position, detect, via the camera, whether a fuel nozzle is in the fuel intake area; and
      deter ignition of a vehicle engine when the fuel nozzle is in the fuel intake area.

2. The vehicle of claim 1, wherein the processor is to enable motor ignition when the fuel nozzle is absent from the fuel intake area.

3. The vehicle of claim 1, wherein the camera that detects whether the fuel nozzle is in the fuel intake area is located on a side-view mirror.

4. The vehicle of claim 3, wherein the camera monitors blind spots when the vehicle is moving.

5. The vehicle of claim 1, further including a global positioning system receiver that enables the processor to determine when the vehicle is at a fueling station for a fueling event.

6. The vehicle of claim 1, further including a sensor to detect when a fueling event is occurring.

7. The vehicle of claim 6, wherein the sensor is at least one of a seatbelt switch, a door-ajar switch, a weight sensor of a vehicle seat, and a fuel level sensor.

8. The vehicle of claim 1, further including a nozzle detection switch to further detect when the fuel nozzle is in the fuel intake area.

9. The vehicle of claim 8, wherein the nozzle detection switch is at least one of a proximity switch and a magnetic switch positioned in the fuel intake area.

10. The vehicle of claim 1, wherein, to deter ignition of the vehicle engine, the processor is to at least one of provide an alarm via an infotainment head unit and disable ignition of the vehicle engine via an emergency override.

11. A method to deter movement of a vehicle with a fuel nozzle, the method comprising:
    in response to an ignition switch being in an on-position, detecting, via a vehicle camera, whether a fuel nozzle is in a fuel intake area of the vehicle; and
    deterring, via a processor, ignition of an engine when the fuel nozzle is in the fuel intake area.

12. The method of claim 11, further including monitoring the ignition switch to determine when the ignition switch is in the on-position.

13. The method of claim 11, further including enabling ignition of the engine when the fuel nozzle is absent from the fuel intake area.

14. The method of claim 11, further including determining, via a global positioning system receiver, when the vehicle is at a fueling station for a fueling event.

15. The method of claim 11, further including detecting, via a sensor, when a fueling event is occurring.

16. The method of claim 15, wherein the fueling event is detected via at least one of a seatbelt switch, a door-ajar switch, a weight sensor of a vehicle seat, and a fuel level sensor.

17. The method of claim 11, wherein further detecting whether the fuel nozzle is in the fuel intake area via at least one of a proximity switch and a magnetic switch in the fuel intake area.

18. The method of claim 11, wherein deterring ignition of the vehicle engine includes at least one of providing an alarm via an infotainment head unit and disabling ignition of the vehicle engine via an emergency override.

19. A tangible computer storage medium comprising instructions which, when executed, cause a machine to:
   in response to an ignition switch being in an on-position, detect, via a vehicle camera, whether a fuel nozzle is in a fuel intake area of a vehicle; and
   deter, via a processor, ignition of an engine when the fuel nozzle is in the fuel intake area.

20. The tangible computer storage medium of claim 19, wherein the instructions further cause the machine to enable ignition of the engine when the fuel nozzle is absent from the fuel intake area.

\* \* \* \* \*